United States Patent [19]

Henderson

[11] 4,133,483

[45] Jan. 9, 1979

[54] PLURAL COMPONENT GUN

[75] Inventor: David Henderson, Darien, Conn.

[73] Assignee: Binks Manufacturing Company, Franklin Park, Ill.

[21] Appl. No.: 812,584

[22] Filed: Jul. 5, 1977

[51] Int. Cl.² .............................................. B05B 7/04
[52] U.S. Cl. ..................................... 239/118; 239/527
[58] Field of Search ............. 239/116, 117, 118, 11 L, 239/414, 415, 527

[56] References Cited

U.S. PATENT DOCUMENTS

| 3,263,928 | 8/1966 | Gusmer | 239/414 X |
|---|---|---|---|
| 3,366,337 | 1/1968 | Brooks et al. | 239/414 |
| 3,685,736 | 8/1972 | Diegelman | 239/118 |
| 3,687,370 | 8/1972 | Sperry | 239/117 X |
| 3,786,990 | 1/1974 | Hagfors | 239/117 |
| 4,053,283 | 10/1977 | Schneider et al. | 239/117 X |

Primary Examiner—John J. Love
Attorney, Agent, or Firm—Gary, Juettner & Pyle

[57] ABSTRACT

A gun for mixing and dispensing plural component plastic materials, and for example as polyurethane foam, is provided with a purging device operable independently of the foam mixing and dispensing mechanism. The purging device comprises a rod, normally positioned rearwardly of the foam component inlet orifices and mixing chamber, the rod being selectively actuable independently of the foam mixing and dispensing operations, by a two way air cylinder controlled by the gun operator.

6 Claims, 2 Drawing Figures

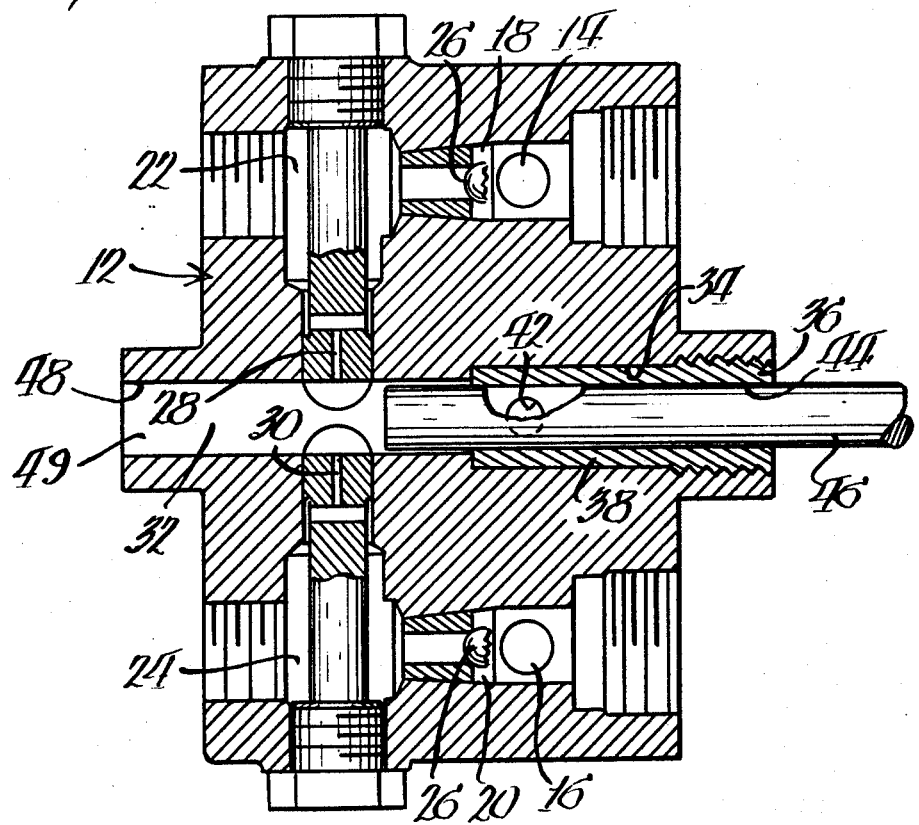

PLURAL COMPONENT GUN

This invention relates to guns for mixing and dispensing plural component plastic materials, and for example as polyurethane foam, and particularly to an improved arrangement for purging residue from the mixing chamber.

BACKGROUND OF THE INVENTION

The purging device of this invention relates to plural component plastic application equipment or guns of the general type described and claimed in U.S. Pat. No. 3,366,337, issued Jan. 30, 1968, wherein two coreactive streams of chemicals are intimately mixed within the gun and dispensed as a fluent stream or spray. The present invention will be described in connection with plural component foam producing chemicals, but is understood to be generally applicable to mixing guns of the general character irrespective of the particular chemicals used.

One problem which arises in prior art foam guns is that, between operations, the residual material in the mixing chamber and/or outlet nozzle tends to harden and jam the outlet thereby making further mixing and dispensing impossible until the chamber and nozzle are purged of the hardened residue. Purging was accomplished, for example, in the aforementioned patent, by manually opening a needle valve to admit a flow of solvent and/or air through the chamber and nozzle to remove the residue.

This purging procedure had several disadvantages. First, the basic operation required the use of two hands because the needle was opened and closed by a threaded knob. Second, the use of solvent added unnecessary expense to the foam process. Further, the solvent, because of being ejected under pressure, was dispersed into the surrounding air and created a potential safety and health problem. Still further, the blast of solvent and/or air, while forcefully ejecting the hardened foam, scattered the residue haphazardly. Overall, this cleaning arrangement was inefficient.

Other prior art arrangements, such as for example Gusmer Pat. No. 3,263,928 and Gusmer et al U.S. Pat. No. 2,890,836, in an attempt to overcome the mentioned difficulties, utilize a rod to eject excess material between spraying operations. In these devices, the rod purports to purge the mixing chamber and outlet nozzle on a single stroke each time the gun is shut off. However, such rods were designed to scrape the walls of the chamber, were utilized as the valving mechanism to open and close the infeed orifices and, for this reason, could be utilized for only one purging stroke for each dispensing operation. In practice, it was found that on the return stroke the rod tended to pull back some of the residue. If the gun was then left unused for a period of time, the residue hardened and bonded causing the gun to jam. For this reason, such guns utilized a solvent bath giving rise to the same problems mentioned heretofore relative to other prior art foam guns.

SUMMARY OF THE INVENTION

The present invention overcomes the difficulties of prior art guns by the provision of a purging rod operable completely separate from and independently of the foam mixing and dispensing means of the gun. The purging rod is not utilized to open and close the inlet ports for the chemicals which form the foam. For this reason, the gun may be utilized several times without using the purging device and, most important, when purging becomes necessary, the operator can actuate the purging device any number of consecutive times, without activating the dispensing or mixing operation, to insure complete purging.

Other objects and advantages of the present invention will be apparent from the following detailed description.

THE DRAWINGS:

FIG. 1 is a side elevational view of the gun of the present invention, partly in vertical longitudinal section; and FIG. 2 is a fragmentary longitudinal section, taken substantially on line 2—2 of FIG. 1, of the spray head of the gun.

DETAILED DESCRIPTION

Figure 1:
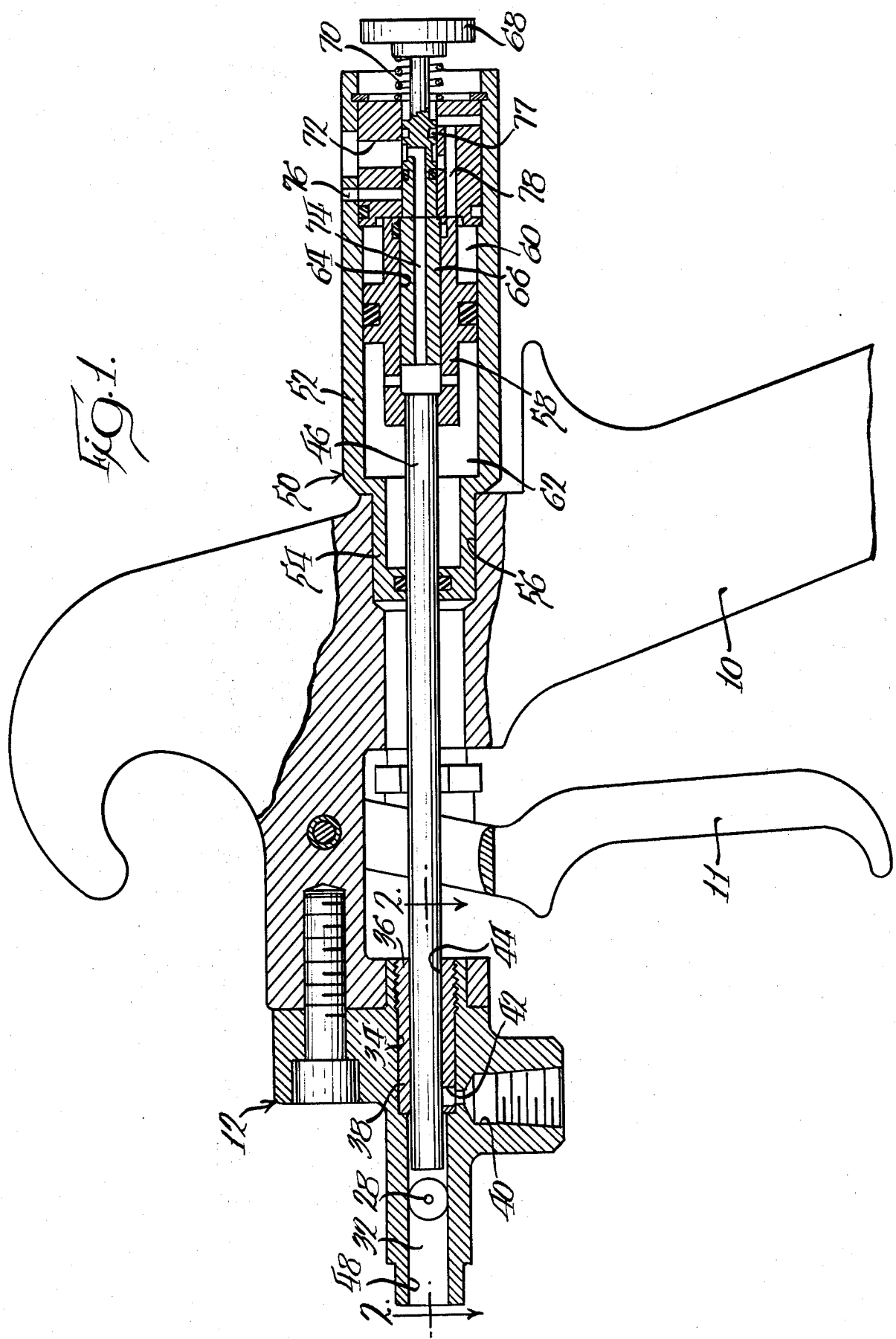

Referring to FIG. 1 of the drawings, the gun body is designated by reference numeral 10. Secured to the body 10 is a gun head 12, modified in accordance with the present invention.

The valving details, the controls, the chemical component supply sources, and the like, have been omitted for brevity because, in this preferred embodiment, they are identical to those described in the aforementioned U.S. Pat. No. 3,366,337, which is incorporated herein by reference.

Briefly, the liquid chemical reactant components are supplied through inlet orifices 14 and 16 to chambers 18 and 20. The chambers 18 and 20 communicate with opposed cross-bores or ducts 22 and 24 and the flow of each liquid chemical is controlled by valve means, fragmentarily indicated by reference numeral 26.

As is known in the art, the two valve means 26 are normally closed but are opened substantially simultaneously when dispensing is desired by movement of a gun trigger 11 by the operator of the device. When valves 26 are opened, the chemical reactants flow into ducts 22-24 and through impingement orifices 28 and 30 into a cylindrically shaped mixing chamber 32 where they are thoroughly mixed, the mixture then being ejected from the discharge outlet 49 at the exit end of the mixing chamber.

The rearward end of the gun head 12 is provided with a bore 34 axially aligned with mixing chamber 32, the bore being threaded for a portion of its length to receive the threaded portion 36 of a sleeve 38, the main body of which is snuggly and sealingly received in the bore 34. The sleeve 38 preferably is formed of Teflon or other low friction material. Opening 40 is not essential but may be utilized as a drain hole for excess material, the opening being aligned with a corresponding opening 42 in sleeve 38.

The sleeve 38 is provided with an axial bore 44 in which a purging rod 46 is slidingly and sealingly received. It is important to note that the purging rod 46 is coaxial with and preferably of a smaller diameter than the bore 48 of mixing chamber 32. The rod, therefore, does not scrape on the inner wall of the chamber, thereby minimizing the chances of the rod becoming clogged with foam and sticking in the chamber.

It should be noted also that the purging rod, in its retracted position as shown in the drawings, is positioned rearwardly of the inlet orifices 28 and 30.

An important feature of the present invention is that the rod 46 is utilized only for purging the mixing chamber and outlet and has nothing whatsoever to do with the starting and stopping of the mixing or dispensing operations. In other words, the gun may be operated several consecutive times without using the purging rod and, conversely, the purging rod may be moved through any number of consecutive purging strokes without utilizing the mixing or dispensing mechanisms. This is extremely advantageous because it is at times difficult to adequately purge the mixing chamber and outlet nozzle of the gun with a single stroke of the rod.

The purging rod, in the preferred embodiment, is operated by a double acting air cylinder, designated generally in FIG. 1 by the numeral 50.

The cylinder body 52 has a forward portion 54 which is removably fitted within an opening 56 in the rearward surface of the gun body 10 coaxial with the mixing chamber 32. A piston 58, which is secured to the purging rod for movement therewith, divides the cylinder bore into an advance chamber 60 and return chamber 62.

Piston 58 is provided with an axial bore 64 in which is slidably received a valving rod 66 having its rearward end projecting outwardly of the cylinder body and provided with a push button 68. A spring 70 biases the valving rod to an outward or retracted position.

Air under pressure is fed from a suitable source into inlet opening 72, through axial post 74 in rod 66, the forward portion of bore 64, and into return chamber 62, thereby normally holding all of the cylinder elements and the purging rod 46 in a retracted position as shown in the drawings.

When the foam gun operator at any time desires to operate the purging rod to purge excess or residual material from the mixing chamber 32, he merely depresses the push button 68, moving the valving rod 66 forwardly in the piston 58. This movement causes the port 74 to become aligned with an air outlet or exhaust opening 76 and permits the air in return chamber 62 to escape through exhaust opening 76. Simultaneously, air is admitted through a second port 77 in the valving rod 66 and through a passage 78 into advance chamber 60, pushing the piston 58 and purging rod 46 forward. Release of the push button reverses the foregoing procedure so that the piston and purging rod are returned to the position shown in the drawings.

Preferably, the stroke of the piston 58 is sufficiently long to drive the purging rod 46 entirely through and out the forward end of the mixing chamber 32.

It is apparent from the above description that the purging rod may be selectively utilized for any desired number of purging strokes completely independently of any foam mixing or operations. This is critical to adequate and complete purging because it is virtually impossible to perform adequate purging with a single stroke of a rod withoug the messy, hazardous use of cleaning fluids. Such cleaning fluids are eliminated with this invention.

Also, the purging rod and its actuating air cylinder are readily removable by hand from the gun for maintenance by simply unscrewing or sliding the air cylinder out of the gun body and retracting the purging rod rearwardly through the head and body of the gun.

It will be obvious to those skilled in the art that the purging arrangement of the present invention may be utilized in many types of foam guns and is not limited to use with the preferred gun illustrated herein by way of example.

It will also be obvious that variations may be made in the two way valve system without departing from the spirit of the invention. As one example, the push button control may comprise a remote control switch mounted on the gun body below the two way cylinder and therefore be considered even more conveniently accessible to the operator of the device.

What is claimed is:

1. A plural component mixing and dispensing gun comprising a gun body having a trigger; a head secured to the body; said head having a mixing chamber with a discharge outlet at its forward end; inlet orifices communicating with said chamber; trigger actuated means for intermittently feeding streams of reactant liquids through said orifices into said chamber so that the liquids form a reactive mixture which is discharged through said discharge outlet; said head having an opening axially aligned with said chamber rearwardly thereof; a purging rod received in said opening; means for biasing said rod to a normally retracted position rearwardly of said orifices; and means independent of said trigger actuated feeding means for selectively moving said rod forwardly through said chamber in a chamber purging stroke.

2. A gun according to claim 1, wherein said purging rod is smaller than said mixing chamber and outlet.

3. A gun according to claim 1, wherein said biasing means comprises a double acting air cylinder mounted on the gun and having a piston secured to the purging rod and movable therewith and normally air biased into a retracted position, and wherein the means for moving the purging rod on a purging stroke comprises a push button pressure actuable to reverse the air flow in said cylinder to move the piston and rod forwardly, said push button being spring biased to retracted position upon release of pressure thereon.

4. A gun according to claim 1, including low-friction sleeve means in said gun head rearwardly of said mixing chamber, said rod being slidably received in said sleeve.

5. A gun according to claim 1, including an air cylinder mounted on the gun body and having a piston secured to the purging rod and movable therewith; and means independent of said trigger for selectively supplying air to the rearward side of the piston for driving the purging rod forwardly through the mixing chamber.

6. A gun according to claim 5, including an opening in the gun body within which said air cylinder is removably received, whereby said cylinder and said purging rod are readily removable from the gun.

* * * * *